(12) United States Patent
Viaud

(10) Patent No.: US 7,404,356 B2
(45) Date of Patent: Jul. 29, 2008

(54) SINGLE FRONT IDLER ARM

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 179 days.

(21) Appl. No.: 11/233,786

(22) Filed: Sep. 23, 2005

(65) Prior Publication Data

US 2006/0075736 A1     Apr. 13, 2006

(30) Foreign Application Priority Data

Sep. 28, 2004    (EP)   ................................. 04104715

(51) Int. Cl.
*B30B 5/04*     (2006.01)
(52) U.S. Cl. ............................... 100/87; 100/88; 56/341
(58) Field of Classification Search .................... 100/87, 100/88, 89; 56/341, 344
See application file for complete search history.

(56) References Cited

U.S. PATENT DOCUMENTS

| 4,545,298 A | 10/1985 | Viaud et al. | |
|---|---|---|---|
| 5,615,544 A * | 4/1997 | Berger et al. | 56/341 |
| 5,768,986 A * | 6/1998 | Arnold et al. | 100/88 |
| 5,913,805 A * | 6/1999 | Vodon | 56/341 |
| 6,332,309 B1 * | 12/2001 | Rodewald | 56/341 |
| 2004/0031402 A1 * | 2/2004 | Viaud | 100/88 |
| 2005/0091959 A1 * | 5/2005 | Viaud et al. | 56/341 |

FOREIGN PATENT DOCUMENTS

| DE | 198 51 470 | 5/2000 |
|---|---|---|
| DE | 199 41 604 | 10/2000 |
| DE | 102 50 425 | 5/2004 |
| EP | 0 894 428 | 2/1999 |

* cited by examiner

*Primary Examiner*—Jimmy T Nguyen

(57) ABSTRACT

A round baler of the variable chamber type is provided with a pivot arm having mobile rolls which in cooperation with stationary rolls form loops of a baling member. The pivot arm is journalled substantially above a bale chamber and is pivotably mounted so as to be able to pivot through an upper front area of the bale chamber.

7 Claims, 5 Drawing Sheets

SINGLE FRONT IDLER ARM

BACKGROUND

1. Field of the Invention

This invention relates to a round baler having at least one flexible bale forming means trained over stationary and mobile rolls. More specifically, it relates to such a round baler where at least some of the mobile rolls are provided on a pivot arm.

2. Related Technology

Round balers are generally well known and typically include a bale chamber enclosed by a series of belts that are trained over a tension arm. In U.S. Pat. No. 6,662,309, the tension arm carries two rolls, which form two loops of the belts about two stationary rolls in the upper rear part of the round baler. A series of other rolls is provided in the front area of the round baler. As such, a tensioning mechanism of the tension arm has to extend over the upper edge of the round baler in order to keep the belts tensioned. During unloading a finished bale, with this construction, the tension arm has to be kept in a raised position.

One problem with the above construction is seen with increased dimensions of the round baler. When the pivot arm is fully raised, difficulties arise during bale unloading.

SUMMARY

In overcoming the drawbacks and limitations of the known technologies, the present invention provides a pivot or tension arm that moves substantially in the front part of the round baler and does thus not obstruct the opening through which the bale is discharged. Furthermore, the pivot or tension arm may follow the bale when it is rolled out of the chamber, keeping the slack out of the baling means.

The baling means (which may be a series of adjacent and parallel belts, a single belt, various sets of offset belts, a chain and slat conveyor or the like) is kept tight with little movement of the pivot arm. Rolls are provided on the pivot arm to create loops about stationary rolls on the baler frame or side structures. It has been found that two rolls on the pivot arm cooperating with three rolls on the side structures are normally sufficient. Obviously three mobile and four stationary rolls would reduce the movement needed by the pivot arm. Furthermore, the pivot arm could carry a greater number of rolls than provided on the side structures to create the number of required loops.

Starting the bale formation is simplified with the present invention by immediately pressing the incoming crop against the baling means, which may run in either direction. For that purpose, rolls are provided at each side of the crop inlet. These rolls may be stationary located at a fixed location or may change their position in order to adjust to the bale shape. While one roll on each side may be sufficient, another roll(s) could be arranged close to the roll or rolls.

An unloading pivot frame, being a short frame supporting the bale by means of rolls and the baling means routed over these rolls, pivots substantially about a center axis of the bale chamber or about an axis close to it. This provides for a faster unloading of the bale since the pivot frame does not need to be raised as much as an ordinary gate known in the prior art. Since the frame is not journalled in the upper area of the bale chamber, this also does not create an interference between the pivot arm and the frame or gate.

The use of a stationary roll at the lower end of the crop inlet, which is adjacent to a front roll on the frame when latter is in its bale forming position, provides for another support of the bale during formation. Such a stationary roll can have quite a large diameter, like a drum and a pair or series of rolls could be alternatively provided. Furthermore, a converging auger or a cutting rotor could be provided in parallel relationship with the stationary roll to feed the crop into the crop inlet.

In the construction in which the unloading pivot frame is of a substantially triangular shape, whereas in the empty stage of the round baler the pivot axis of the frame is located in an upper corner area and the front roll is located in a lower front corner area and the rear roll is located in lower rear corner area of the frame, a simple and reliable structure is achieved. Also, by having the pivot axis of the frame longitudinally between the front and rear roll of the frame the frame assumes a stable and well-balanced position during the bale formation.

Various spans of the bale forming means are kept out of contact and do not rub with each other, if one roll is provided in a location remote enough (like in the upper rear corner area of the side structures) to keep such means apart. Having a second roll parallel to the first roll and routing the bale forming means between these rolls assures that the bale forming means is always kept in the track, regardless of the position of the pivot arm.

When the frame is pivoted into its unloading position, no slack will happen in the bale forming means if one of the rolls in the rear upper area acts as an idler roll forming a loop in the bale forming means. Formation of a loop is achieved if the radial distance between the stationary rolls in the upper rear area and the pivot center of the unloading pivot frame is smaller than the distance between the lower rear roll on the frame and its pivot axis. Obviously, positioning the idler roll into various positions can vary the size of the loop.

The bale forming means creates another loop, in which the bale actually may be formed and rolled, if it is trained through a gap between two stationary rolls above the crop inlet, whereas the upper roll will act as idling roll. Having two rolls adjacent each other also reduces the load acting on the bale forming means, which consequently results in less likelihood of the crop wrapping the idling roll.

Wrapping or tying material, such as netting, plastic sheeting or twine, may easily be provided about the rotating bale by feeding it into the bale chamber between the two stationary rolls above the crop inlet. The wrapping or tying mechanism may be located very close to the crop inlet, since latter and the adjacent rolls are located in the front of the round baler, where sufficient space is available.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION

Figure 1:
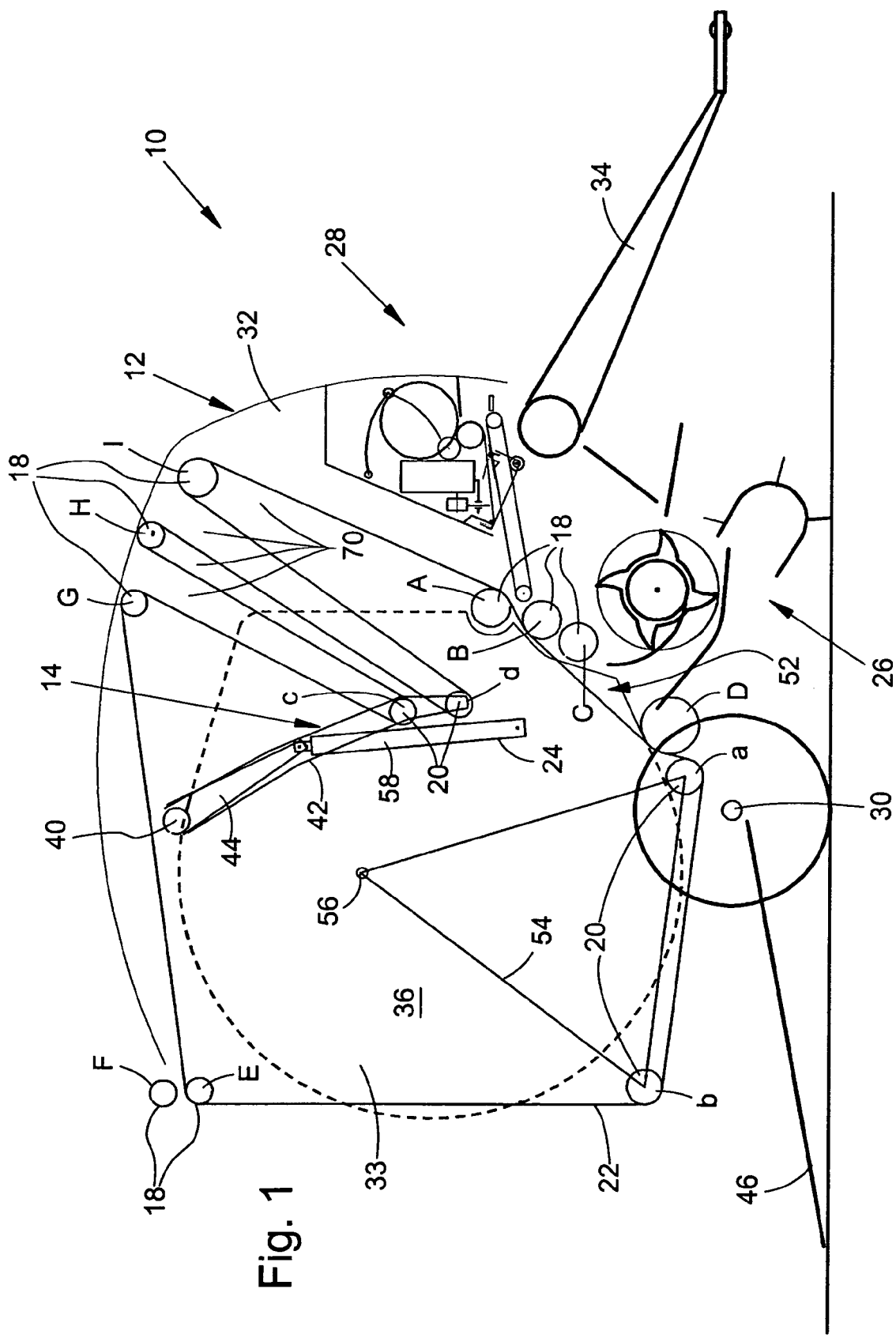
FIG. 1 is a schematic illustration of a round baler according to the principles of the present invention in an empty state.

Referring now to the drawings, FIG. 1 shows a round baler 10 having a chassis 12, a pivot or tension arm 14, stationary rolls 18, mobile rolls 20, baling means 22, a baling means control 24, a feeding mechanism 26 and a wrapping mechanism 28.

The round baler 10 is of the variable chamber type and is pulled behind a tractor or the like (not shown) over a field to pick-up crop and to form round cylindrical bales 38 thereof. Alternatively the round baler 10 may be part of a self-propelled type. Finally a common unloading system 46 is provided in the rear lower region of the round baler 10.

The chassis 12 has a wheeled axle 30, side structures 32 to which lateral walls 33 and a tongue 34 are attached, the latter of which allows the baler 10 to be pulled by the tractor. The wheeled axle 30 may be of the single rigid axle type, as shown, or of the tandem axle type, with or without spring suspension. Each side structure 32 is oriented vertically, carried by the wheeled axle 30 and forms the round baler 10 laterally. Such side structure 32 and independent walls 33 are disclosed in more detail in U.S. Pat. No. 6,640,699 which is herein incorporated by reference, but this invention is not limited to such a design. With the present embodiment, the side structures 32 are not split in the area of a bale chamber 36 (in FIG. 1 indicated in its maximum size). The side structures 32 stay in place, when a formed bale 38 is ejected, as opposed to sidewalls in the prior art, of which a rear portion is lifted during unloading the bale 38. While in general the walls 33 could be an integral part of the side structures 32, they are shown as dashed lines, are attached to the side structures 32 and assume as the only function to cover the bale chamber 36 laterally. Unlike the prior art they are not split in halves and do not or hardly extend beyond the silhouette of a completed bale 38. If such separate walls 33 are desired, the pivot arm 14 and the stationary rolls 18 are carried by other parts of the side structures 32. The distance between the walls 33 on the side structure 32 may be adjustable during operation.

The pivot arm 14 is located between the side structures 32 and assumes substantially the form of a "U". The base of the "U" of the pivot arm 14 is journalled on an axis 40 oriented horizontally and transverse to the travel direction of the round baler 10 and fixed with respect to or in the side structures 32. The axis 40 is located approximately two fifth of the side structure 32 length from the rear and one eighth of the side structures 32 height from the top. Legs 42 of the "U" of the pivot arm 14 extend parallel to the side structures 32 or its walls 33 and are pivotable in a vertical direction between a 5:00 (bale start position) and 3:00 (full bale position) o'clock pointer position, when viewed from the right hand side, shown in FIGS. 1 and 2. The length of the almost straight legs 42 reaches about half of the height of the side structure 32, i.e. they terminate substantially close to the height of a stationary roll 1, when the bale chamber 36 is empty. Rigidly connected to the legs 42 or to the base of the "U" is at least one lever arm 44.

Stationary rolls 18 have end portions being rotatably journalled in, or at the side structures 32, whereas they all run parallel to each other and parallel to the ground on which the baler 10 stands. Deviating from the shown embodiment more or less stationary rolls 18 may be present, whereas most of them are of the same design, i.e. a roll body journalled on a shaft or stub shaft or a roll body with fixed stub shafts or a shaft rotatably received in bearings (not shown) in side structures 32. However, the diameter of the rolls 18 may be different from roll 18 to roll 18. It is obvious that "stationary" or "fixed" means, that their position is fixed, whereas the rolls 18 as such can rotate and can be removed. For the sake of the ongoing description the stationary rolls 18 are designated by capital letters "A" to "I", whereas "A" refers to a stationary roll 18 above an inlet 52 to the bale chamber 36 and above the feeding mechanism 26; "B" refers to a stationary roll 18 above the inlet 52, but below and slightly offset to the rear of stationary roll 18A, (between rolls 18A and 18B a gap exists); "C" refers to a stationary roll 18 above the inlet 52, but below and slightly offset to the rear of stationary roll 18B and close to the feeding mechanism 26; "D" refers to a stationary roll 18 close to the lower edge of the inlet 52, whereas said stationary roll 18D has the biggest diameter of all stationary rolls 18; "E" refers to a stationary roll 18 close to the upper rear edge of the side structures 32; "F" refers to a stationary roll 18 close to the upper rear edge of the side structures 32 and slightly above stationary roll E, but leaving a gap between them; "G" refers to a stationary roll 18 located in the upper front area of the side structures 32, close to its upper edge and being the rearmost one of a set of three stationary rolls 18; "H" refers to a stationary roll 18 located in the upper front area of the side structures 32, close to its upper edge and being the middle one of the set of three stationary rolls 18; and "I" refers to a stationary roll 18 located in the upper front area of the side structures 32, close to its upper edge and being the most forward one of the set of three stationary rolls 18, whereas all three rolls G to I are oriented in a plane slanted downwardly to the front.

At least one of the rigid rolls 18 is driven and formed such that it may transfer movement energy from the driven roll 18 to the baling means 22. Some of the rolls 18 may also have guides for the baling means 22.

The mobile rolls 20, i.e. those, the position of which may vary during the baling process, run parallel to the stationary rolls 18 and are of comparable design. The mobile rolls 20 are designated by small letters "a" to "d" whereas "a" refers to a mobile roll 20 located in a lower front corner area (as seen in FIG. 1) of unloading pivot frame 54; "b" refers to a mobile roll 20 located in a lower rear corner area (as seen in FIG. 1) of the unloading pivot frame 54; "c" refers to a mobile roll 20 close to the end region (remote from the axis 40) of the legs 42 of the pivot arm 14; and "c" refers to a mobile roll 20 in the end region (remote from the axis 40) of the legs 42 of the pivot arm 14.

The unloading pivot frame 54 is in substantially the form of a triangle, an upper corner (as seen in FIG. 1) of which is journalled about an axis 56, parallel to the axis 40 and close to the center of bale chamber 36, when being filled. The rear lower corner area of the unloading pivot frame 54 finds itself in the rear lower corner area of the side structures 32 and the front lower corner area of the unloading pivot frame 54 is located immediately behind the stationary roll 18D—each when viewing FIG. 1.

The baling means 22 in this embodiment is formed by a set of belts, running parallel to each other in laterally spaced relationship. Alternatively, a single endless belt or a chain and slat conveyor could be used to provide for flexibility, allowing running over the rolls 18 and 20. The routing of the baling means 22 is described in the following with respect to the embodiment and mode of operation shown in FIG. 1.

Starting from stationary roll A the routing of the baling means 22 about rollers 18 and 20 is: between A and B—over B—passing or running over C—over D—between D and a—over b—between E and F—over G—around c—around H—around d—around I—A. In this routing loops 70 are formed by means of the strands between stationary rolls G, H, and I as the baling means 22 is routed over mobile rolls c and d. The size of the loops 70 decreases with growing bale 38 and is determined by the position of the pivot arm 14 and the mobile rolls c and d thereon.

The baling control means 24 is composed of various elements such as a pump, sump, valves, sensors, lines, a CPU, etc. (not shown) and, for the pivot arm 14, one actuator 58 extending between and pivotally fixed to the lever arm 44 and the side structure 32. The control means 24 receives and computes signals coming from the various round baler components as well as from an operator. The output signals of the CPU controlling the actuator 58 are such, that during or after bale formation, a certain resistance acts onto the pivot arm 14 to provide for a wanted density in the bale 38 and that, after unloading the bale position. The actuator 58 of this embodiment is in the form of a single or double acting linear hydraulic motor. Alternatively, it could be an electric motor. As shown in the drawing, only a single actuator 58 is used to control the position of the pivot arm 14, wherein the actuator 58 is oriented vertically during almost the entire baling process. Alternatively, to the use of an actuator 58 in the form of a hydraulic cylinder attached directly to the pivot arm 14 or its lever arm(s) 44, one could use a hydraulic cylinder for one direction and a spring for a movement in the other direction; one could use a strong spring only, like a coil spring; one could us an electric or pneumatic motor; one could apply the actuator—being in the form of a hydraulic cylinder, of a spring, or of a motor—via a cable or linkage to the pivot arm 14 or directly to the pivot arm 14. The unloading pivot frame 54 is raised and if need to lowered by an unshown hydraulic actuator, which is controlled as well by this baling control means 24 to achieve a synchronized movement.

The feeding mechanism 26 is designed in the usual way. As such it includes a pick-up 60, downstream thereof a conveyor 62 formed as a cutting unit, a converging auger or other transport mechanism and in the area of the inlet 52 the stationary 18D, which all together assist in taking crop from the ground and deliver it through the inlet 52 into the bale chamber 36, where it is rolled to a bale 38.

The wrapping mechanism 28 supplied net or other wrapping material into the bale chamber 36 between the baling means 22 and the bale 38, whereas a supply means 16—not disclosed in further detail—is used to transport wrapping material to the gap between the stationary rolls 18A and 18B into the bale chamber 36. Other than that, the wrapping mechanism 28 is of a known design.

Having described the structure of the round baler 10 so far, its function is as follows, starting from the situation in FIG. 1.

In FIG. 1, a span of the baling means 22 bridges the gap between stationary rolls 18D and 18C to form together with the space in the area of the inlet 52 the beginning of the bale chamber 36. In this situation pivot arm 14 is in its lowest, 5:00 o'clock position. Mobile roll 20a lies adjacent to bottom stationary roll 18D, since the unloading pivot frame 54 assumes its lowest position. The span shows an inclination towards the ground, whereas the upper end of it is further to the front than is the lower end. The actuator 58 assumes its minimal length and the pivot arm 14 assumes its lowest location.

When crop is fed continuously through the inlet 52, a bale 38 will start and grow and push the span towards the interior of the bale chamber 36, which uses continuously length of the baling means 22. As a result thereof the loops 70 release baling means 22 and get shorter, which pulls the pivot arm 14 upwardly thereby extracting actuator 58 against a force provided by resistance in the baling control means 24, for example created by a nozzle, a valve or the like. Pivot arm 14 rotates counterclockwise during bale formation. Movement of the pivot arm 14 and thus also of the mobile rolls 20c and 20d continues until the bale 38 has reached its desired or maximum size—see FIG. 2. When the bale chamber 36 is full, the pivot arm 14 reaches its highest position, in which pivot arm 14 is substantially remote from the circumference of the bale 38, but still within the silhouette of the side structures 32 and finds itself in an almost horizontal position close to the upper front edge of the side structure 32. Accordingly the actuator 58 has been extracted to its maximum length. The unloading pivot frame 54 and the mobile rolls 20a and 20b are still in their lower position and together with the baling means 22 support the bale 38. Since the pivot arm 14 moved towards stationary rolls 20G to I, the loops 70 shortened close to non-existence.

Figure 3:
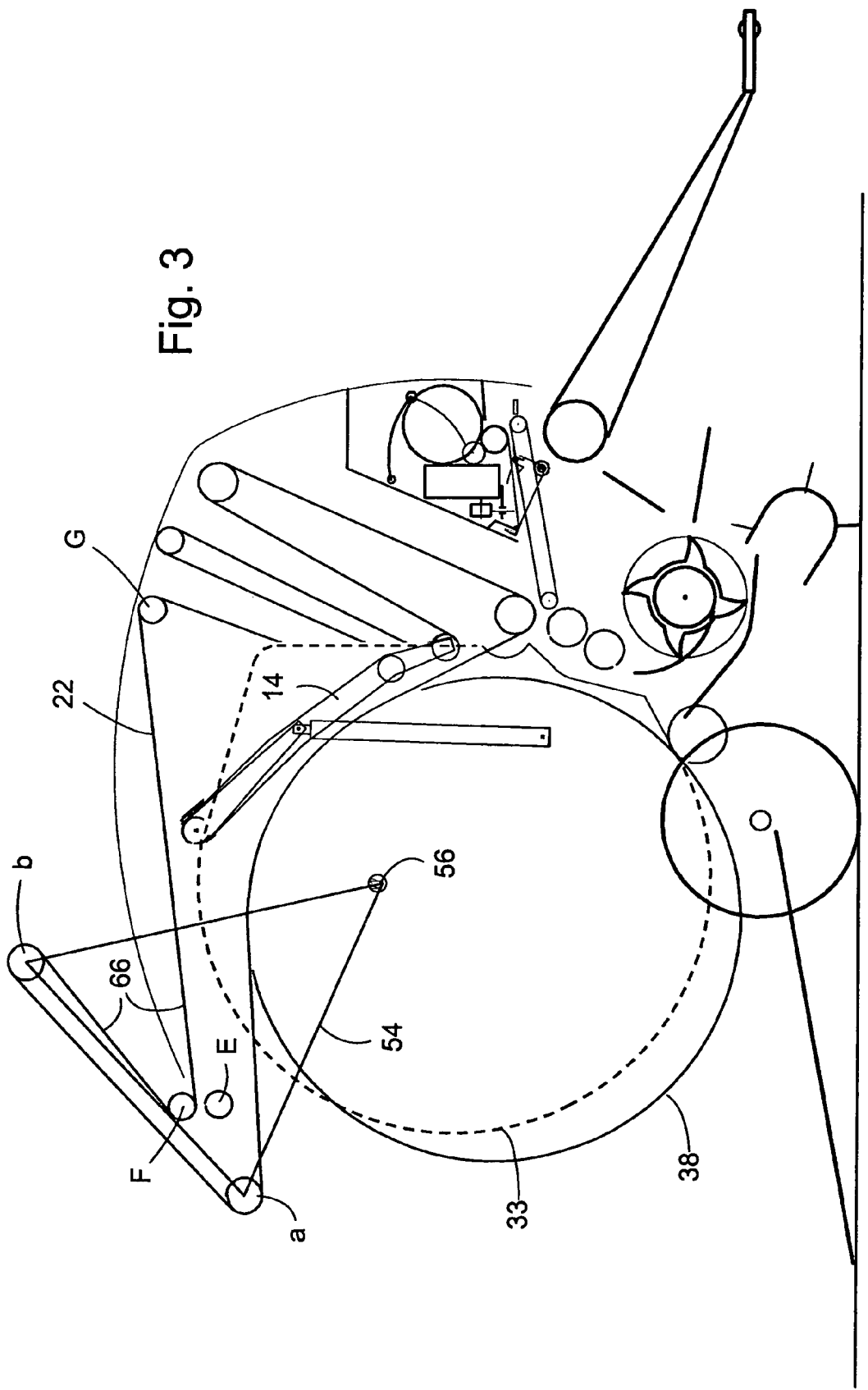
FIG. 3 is a schematic illustration of the round baler of FIG. 1 during an unloading process.

In order to unload the bale 38, the unloading pivot frame 54 is pivoted clockwise about axis 56 into the position shown in FIG. 3, in which a line through the center of mobile rolls 20a and 20b shows and inclination to the ground of about 45 degrees. Due to the upward movement, the span between mobile roll 20b and stationary roll 18G is hit by stationary roll 18F. Stationary roll 18F creates a loop 66 (FIG. 3) to take out slack in the baling means 22, which appears, as soon as the bale 38 rolls out of the bale chamber 36. While the bale 38 leaves the bale chamber 36, pivot arm 14 will rotate in a clockwise direction and follow and act on the out rolling bale 38, which may assist in the rolling movement. Downward movement of the pivot arm 14 causes the loops 70 to enlarge to the biggest possible extent and finally the situation shown in FIG. 1 is reached again.

Figure 2:
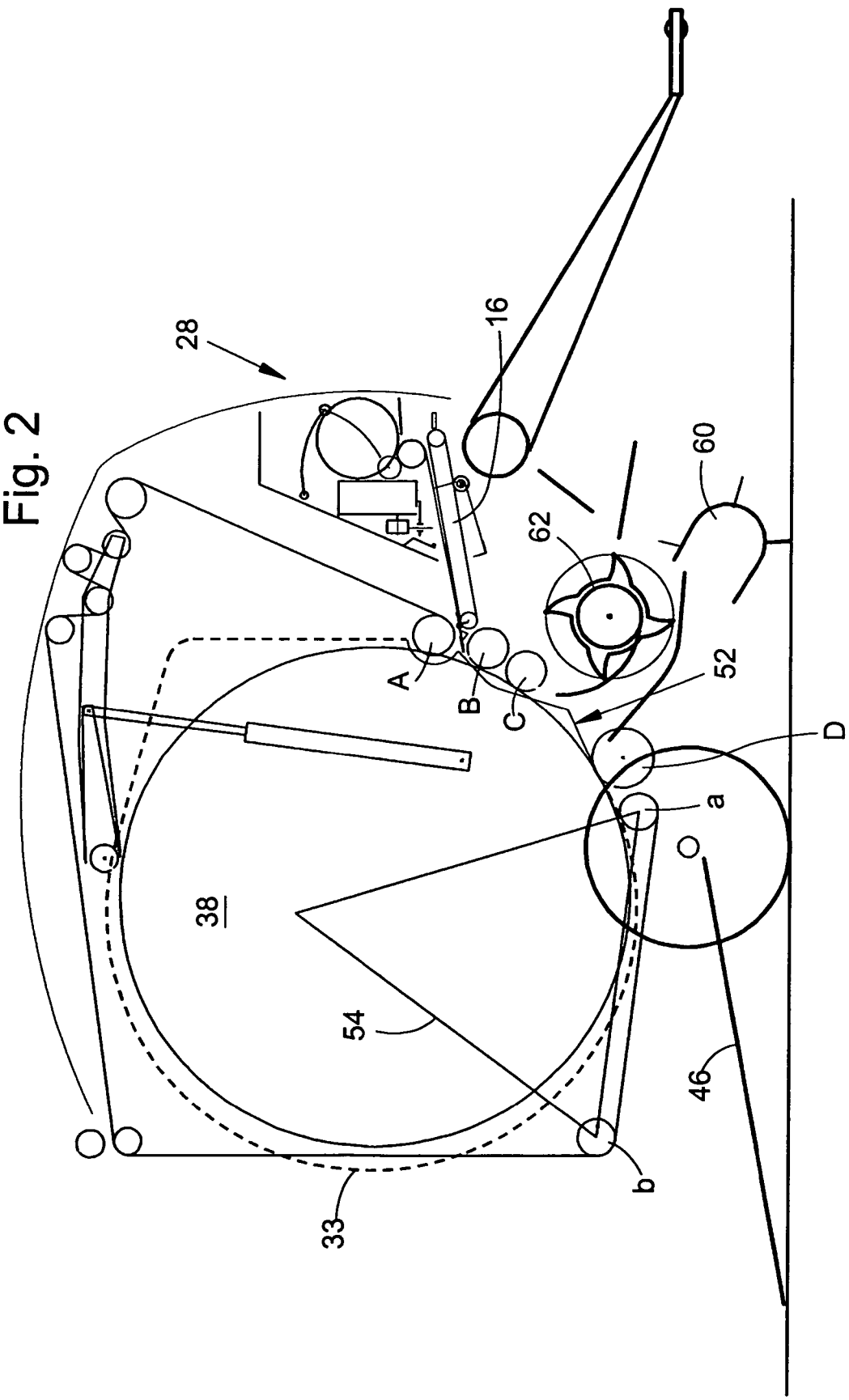
FIG. 2 is a schematic illustration of the round baler of FIG. 1 with a completed bale.
Figure 4:
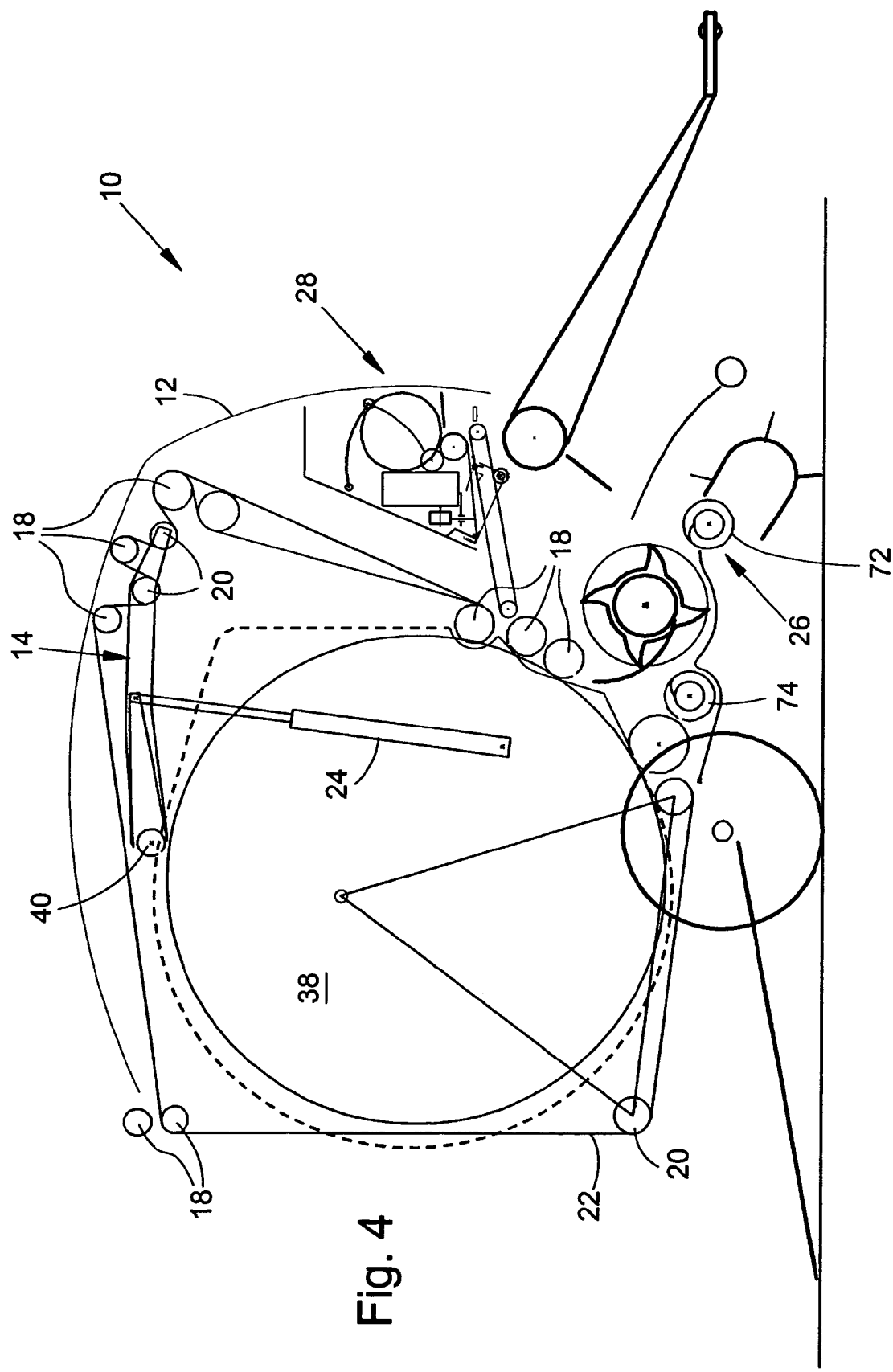
FIG. 4 is a schematic illustration of an alternative feeding device for the round baler of FIG. 1.

FIG. 4 shows a round baler 10 of substantially the same design as the one shown in FIGS. 1 to 3, however having a feeding mechanism 26' which is wider than the bale chamber 36. Due to this fact, a spreading auger 72 is located in front of the conveyor 62 to achieve an equal feeding of latter and downstream the conveyor 62 converging means, again like an auger, is provided, which narrows the crop stream to the width of the bale chamber 36. In this case, like in the case shown in FIGS. 1 to 3, the conveyor 62 acts as an undershot conveyor.

Figure 5:
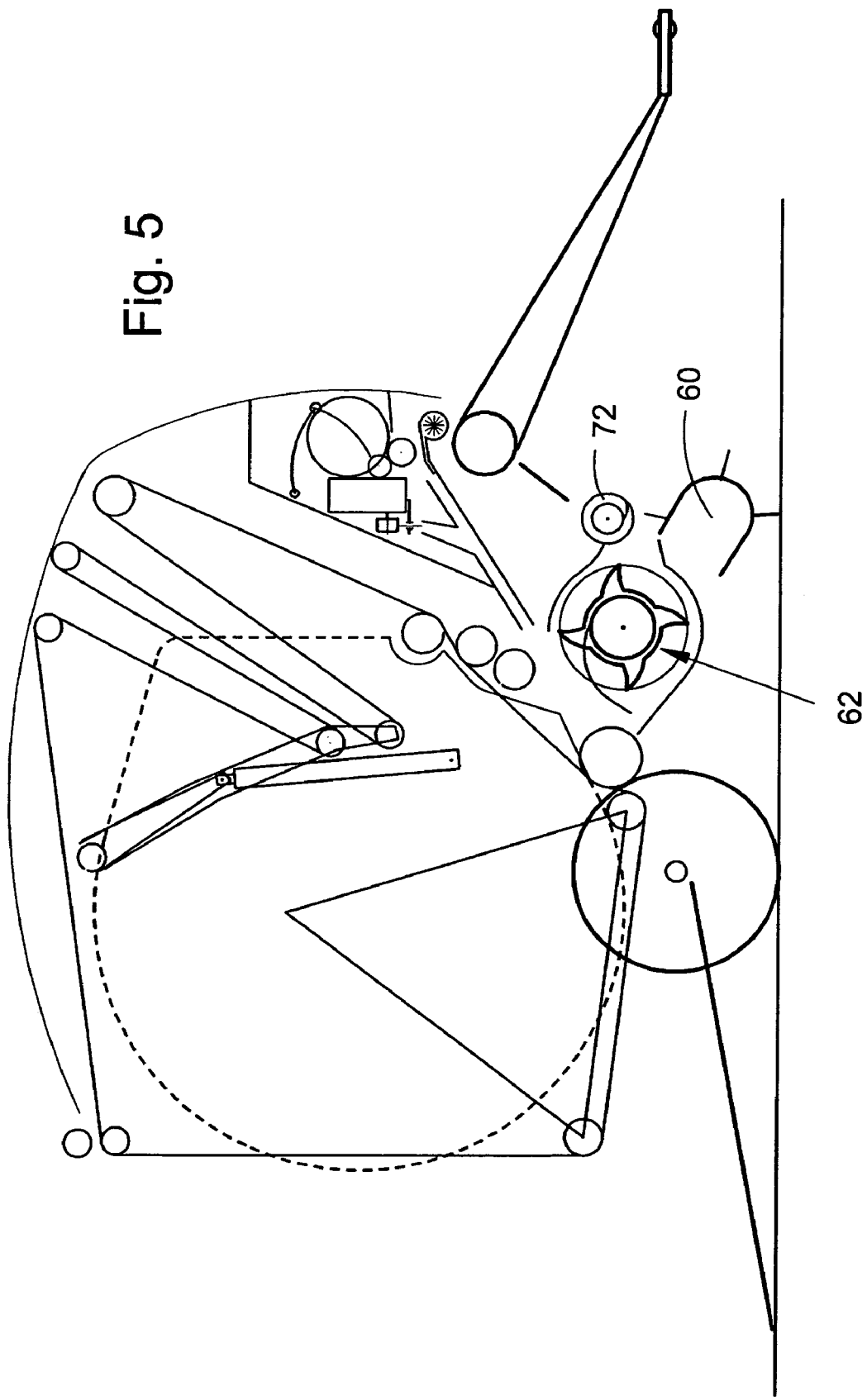
FIG. 5 is a schematic illustration of still another alternative feeding device for the round baler of FIG. 1.

The embodiment shown in FIG. 5 again refers to a round baler 10 substantially according to FIGS. 1 to 3 or 4, but having a conveyor 62 working overshot and being preceded by a spreading auger 72.

What is claimed is:

1. A round baler having at least one flexible baling means being trained over stationary and mobile rolls, the baler comprising: at least some of the mobile rolls being provided on a pivot arm journalled substantially above a bale chamber, the pivot arm being pivotably mounted in about an upper area of the bale chamber for moving through an upper front area of the bale chamber, an unloading pivot frame being pivotably mounted in about a center area of the bale chamber for supporting a bale, the unloading pivot frame is of a substantially triangular shape, whereas in an empty stage of the bale chamber a pivot axis of the unloading pivot frame is located in an upper corner area of the frame, a front mobile roll is located in a lower front corner area of the frame, and a rear mobile roll is located in a lower rear corner area of the unloading pivot frame, a first two stationary rolls of the stationary rolls are provided in an upper rear corner of the round baler and the baling means extending through a gap between the first two stationary rolls, a radial distance between the first two stationary rolls and the pivot axis of the unloading pivot frame being smaller than a distance between the rear mobile roll on the unloading pivot frame and the pivot axis of the unloading frame.

2. The round baler according to claim 1, wherein the at least some of the mobile rolls being provided on a pivot arm comprise at least two mobile rolls, the at least two mobile rolls being idler rolls and cooperating with a plurality of stationary rolls in an upper front area of side structures of the round baler to define at least two loops in the at least one flexible baling means.

3. The round baler according to claim 1 wherein an additional pair of stationary rolls are provided on opposite sides of a crop inlet and are bridged by a span of the baling means.

4. The round baler according to claim 3 wherein during bale formation one roll of the additional pair of stationary rolls is located at the a lower end of the crop inlet adjacent to the front mobile roll on the unloading pivot frame.

5. The round baler according to claim 1 wherein the baling means is trained through a gap between a second two stationary rolls of said stationary rolls, said second two stationary rolls being located above a crop inlet into the bale chamber.

6. The round baler according to claim 5 wherein wrapping material is fed into the bale chamber between the second two stationary rolls located above the crop inlet.

7. The round baler according to claim 1 further comprising a baling control means coupled to the pivot arm and configured to force the pivot arm towards the center of the bale chamber.

* * * * *